(12) United States Patent
Furuno et al.

(10) Patent No.: US 10,974,206 B2
(45) Date of Patent: Apr. 13, 2021

(54) COMPOSITE SEMIPERMEABLE MEMBRANE

(71) Applicant: TORAY INDUSTRIES, INC., Tokyo (JP)

(72) Inventors: Shuji Furuno, Shiga (JP); Yoshiki Okamoto, Shiga (JP); Hiroho Hirozawa, Shiga (JP); Masahiro Kimura, Shiga (JP); Takao Sasaki, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 593 days.

(21) Appl. No.: 14/894,917

(22) PCT Filed: May 29, 2014

(86) PCT No.: PCT/JP2014/064310
§ 371 (c)(1),
(2) Date: Nov. 30, 2015

(87) PCT Pub. No.: WO2014/192883
PCT Pub. Date: Dec. 4, 2014

(65) Prior Publication Data
US 2016/0129401 A1    May 12, 2016

(30) Foreign Application Priority Data
May 30, 2013    (JP) .............................. JP2013-113988

(51) Int. Cl.
*B01D 69/12*    (2006.01)
*B01D 69/10*    (2006.01)
(Continued)

(52) U.S. Cl.
CPC ............. *B01D 69/12* (2013.01); *B01D 69/10* (2013.01); *B01D 69/125* (2013.01); *B01D 71/56* (2013.01);
(Continued)

(58) Field of Classification Search
None
See application file for complete search history.

(56) References Cited

U.S. PATENT DOCUMENTS 3,648,845 A * 3/1972 Riley ..................... B01D 69/12
210/490
4,559,139 A * 12/1985 Uemura ............... B01D 69/125
210/490
(Continued)

FOREIGN PATENT DOCUMENTS

JP    55-14706 A    2/1980
JP    61-222506 A    10/1986
(Continued)

OTHER PUBLICATIONS

Notification of the First Office Action dated Aug. 29, 2016, in Chinese Patent Application No. 201480030844.9, with English translation.
(Continued)

*Primary Examiner* — Krishnan S Menon
*Assistant Examiner* — Brad Gordon
(74) *Attorney, Agent, or Firm* — Birch, Stewart, Kolasch & Birch, LLP

(57) ABSTRACT

In order to provide a composite semipermeable membrane which combines strength and water permeability, the present invention provides a composite semipermeable membrane including: a supporting membrane including a substrate and a porous support; and a separation functional layer disposed on the porous support, in which the substrate has a weight
(Continued)

A per unit area, a portion of the porous support which is located within the substrate has a weight B per unit area, and a sum of the weight A and the weight B, (A+B), is 30 to 100 g/m$^2$, and a ratio between the weight A and the weight B, B/A, is 0.10 to 0.60.

8 Claims, 1 Drawing Sheet

(51) Int. Cl.
  *B01D 71/56* (2006.01)
  *B32B 5/18* (2006.01)
  *B01D 61/02* (2006.01)
(52) U.S. Cl.
  CPC .............. *B32B 5/18* (2013.01); *B01D 61/025* (2013.01); *B32B 2307/54* (2013.01)

(56) References Cited

U.S. PATENT DOCUMENTS

| | | | |
|---|---|---|---|
| 4,728,394 A | 3/1988 | Shinjou et al. | |
| 5,324,538 A | 6/1994 | Takahashi et al. | |
| 5,376,273 A | 12/1994 | Pacheco et al. | |
| 7,435,348 B2* | 10/2008 | Chen ................. | B01D 67/0011 210/500.23 |
| 7,572,321 B2 | 8/2009 | Yamakawa et al. | |
| 7,615,105 B2 | 11/2009 | Odaka et al. | |
| 2005/0087070 A1 | 4/2005 | Odaka et al. | |
| 2006/0090650 A1 | 5/2006 | Yamakawa et al. | |
| 2010/0193428 A1 | 8/2010 | Hane et al. | |
| 2013/0126419 A1* | 5/2013 | Ogawa ................... | B01D 69/02 210/489 |

FOREIGN PATENT DOCUMENTS

| | | | | |
|---|---|---|---|---|
| JP | 62-140620 A | | 6/1987 | |
| JP | 5-76740 A | | 3/1993 | |
| JP | 5-317667 A | | 12/1993 | |
| JP | 7-507237 A | | 8/1995 | |
| JP | 2000-296317 A | | 10/2000 | |
| JP | 2001252541 A | * | 9/2001 | |
| JP | 2006-150323 A | | 6/2006 | |
| JP | 2009-233666 A | | 10/2009 | |
| JP | 2012-24756 A | | 2/2012 | |
| KR | 10-2007-0051837 A | | 5/2007 | |
| WO | WO-2012020680 A1 | * | 2/2012 | ............. B01D 69/10 |

OTHER PUBLICATIONS

International Search Report, issued in PCT/JP2014/064310, dated Aug. 5, 2014.
Notification of Reasons for Refusal dated May 29, 2018, in Japanese Patent Application No. 2014-526282, with English translation.
Office Action dated Jun. 26, 2019, in Korean Patent Application No. 10-2015-7033861.
Office Action dated Sep. 30, 2019, in Korean Patent Application No. 10-2019-7024955.
Office Action dated Mar. 21, 2019, in Korean Patent Application No. 10-2015-7033861, with English translation.

* cited by examiner

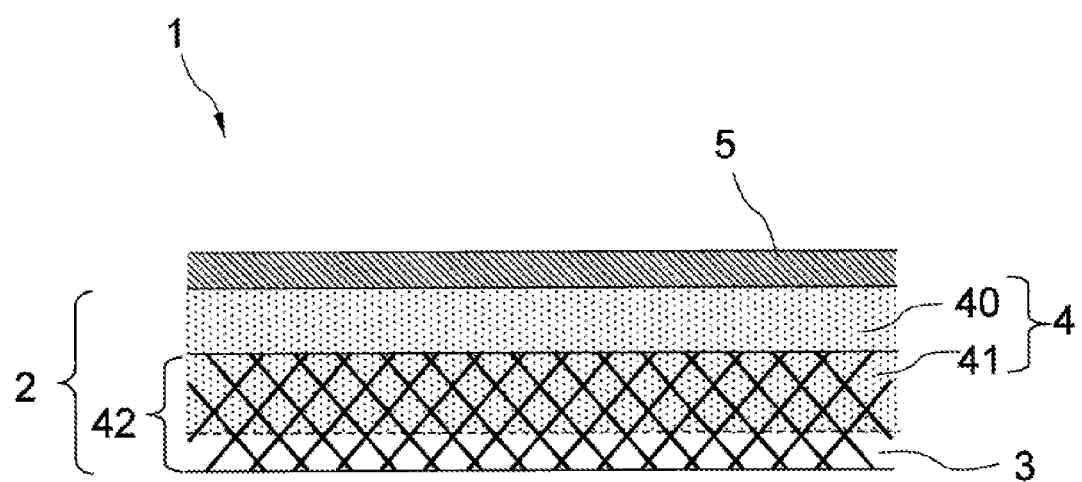

COMPOSITE SEMIPERMEABLE MEMBRANE

TECHNICAL FIELD

The present invention relates to a composite semipermeable membrane useful for selective separation of a liquid mixture and a process for producing the same. The composite semipermeable membrane obtained by the present invention is suitable, for example, for desalination of seawater or brackish water.

BACKGROUND ART

With respect to separation of a mixture, there are various techniques for removing substances (e.g., salts) dissolved in a solvent (e.g., water). In recent years, use of membrane separation methods is expanding for the processes with less energy and resource consumption. The membranes for use in the membrane separation methods include microfiltration membranes, ultrafiltration membranes, nanofiltration membranes, composite semipermeable membranes, and the like, and these membranes are being used in the case of obtaining potable water, for example, from seawater, brackish water, or water containing a harmful substance, and in the production of industrial ultrapure water, wastewater treatment, recovery of valuables, etc.

Most of the nanofiltration membranes that are commercially available at present are composite semipermeable membranes, and there are two types of composite semipermeable membranes: one which includes a gel layer and an active layer obtained by crosslinking a polymer, the layers being disposed on a supporting membrane; and one which includes an active layer obtained by condensation-polymerizing monomers on a supporting membrane. Of these, a composite semipermeable membrane obtained by coating a supporting membrane with a separation functional layer constituted of a crosslinked polyamide obtained by the polycondensation reaction of a polyfunctional amine with a polyfunctional acid halide is in extensive use as a separation membrane having high permeability and separation selectivity (Patent Documents 1 and 2).

When a composite semipermeable membrane is used to conduct separation, mechanical strength is required of the membrane. For example, in the case where impurities contained in water have sedimented on a surface of the composite semipermeable membrane to cause clogging of the composite semipermeable membrane or reduce the efficiency of pure-water production, a method in which the composite semipermeable membrane is flushed with a high-pressure water stream is often employed. In case where this composite semipermeable membrane has poor strength, the membrane suffers peeling and damage, making it impossible to obtain a satisfactory salt removal ratio. Although the supporting membrane is generally composed of a substrate and a porous support, peeling is prone to occur at around the interface between the substrate and the porous support.

Patent Document 3 discloses a feature in which high water permeability in the permeation direction and an improved flow rate are attained and contamination resistance and resistance to chemicals are ensured by a polyamide layer.

Patent Document 4 discloses a support for semipermeable membranes which is constituted of a nonwoven fabric for performing membrane formation.

Patent Document 5 discloses examples in which poly(vinyl chloride) or a chlorinated vinyl chloride resin is used as the porous support of a composite semipermeable membrane.

BACKGROUND ART DOCUMENT

Patent Document

Patent Document 1: JP-A-55-14706
Patent Document 2: JP-A-5-76740
Patent Document 3: JP-A-2009-233666
Patent Document 4: JP-A-61-222506
Patent Document 5: JP-A-2000-296317

SUMMARY OF THE INVENTION

Problems that the Invention is to Solve

Despite the various proposals described above, a composite semipermeable membrane which sufficiently combines strength and water permeability has not been obtained. An object of the present invention is to provide a composite semipermeable membrane which combines strength and water permeability.

Means for Solving the Problems

The present invention, which is for accomplishing the above-mentioned object, has the following configurations.
(1) A composite semipermeable membrane including: a supporting membrane including a substrate and a porous support; and a separation functional layer disposed on the porous support,
in which the substrate has a weight A per unit area, a portion of the porous support which is located within the substrate has a weight B per unit area, and a sum of the weight A and the weight B, (A+B), is 30 to 100 g/m$^2$, and
a ratio between the weight A and the weight B, B/A, is 0.10 to 0.60.
(2) The composite semipermeable membrane according to (1), in which the substrate has a thickness of 40 to 150 μm.
(3) The composite semipermeable membrane according to (1) or (2), in which the substrate has a porosity of 35 to 80%, an impregnated portion of the porous support into the substrate has a thickness that is 60 to 99% of the thickness of the substrate, and the impregnated portion has a total porosity of 10 to 60%.
(4) The composite semipermeable membrane according to any of (1) to (3), in which the porous support includes a portion disposed so as to be exposed on the substrate, and the exposed portion has a thickness of 50% or less of the thickness of the substrate.
(5) The composite semipermeable membrane according to any of (1) to (4), which has a peel strength of 1 N/25 mm or greater, the peel strength being measured by peeling the porous support from the substrate at 10 mm/min and a peel direction of 180° under a temperature condition of 25° C.
(6) The composite semipermeable membrane according to any of (1) to (5), in which the separation functional layer includes a crosslinked polyamide formed by interfacial polymerization of an aqueous solution of a polyfunctional amine with a polyfunctional acid halide, and the separation functional layer has an average weight of 80 to 200 mg/m$^2$.
(7) The composite semipermeable membrane according to any of (1) to (6), in which the porous support includes a thermoplastic resin.

(8) The composite semipermeable membrane according to (7), in which the thermoplastic resin is at least one thermoplastic resin selected from: polysulfones, poly(phenylene sulfide sulfone)s, polyacrylamide, poly(phenylene sulfone), polyethersulfones and derivatives thereof; cellulose esters; polyacrylonitrile; poly(vinyl chloride); and a chlorinated vinyl chloride-based resin.

(9) The composite semipermeable membrane according to (8), in which the porous support contains the chlorinated vinyl chloride-based resin and has a chlorine content ratio of 60 to 70%, and a polymerization degree of a vinyl chloride-based resin contained in the porous support is 400 to 1,100.

(10) The composite semipermeable membrane according to any of (1) to (9), in which the substrate is a long-fiber nonwoven fabric including a polyester.

Advantage of the Invention

According to the present invention, a composite semipermeable membrane which combines strength and water permeability is rendered possible.

BRIEF DESCRIPTION OF THE DRAWINGS

FIG. 1 is a cross-sectional view which diagrammatically shows a composite semipermeable membrane according to an embodiment of the present invention.

MODE FOR CARRYING OUT THE INVENTION

1. Composite Semipermeable Membrane

The composite semipermeable membrane of the present invention includes a supporting membrane and a separation functional layer disposed on the porous support.

(1-1) Supporting Membrane

The supporting membrane includes a substrate and a porous support, and is a membrane that has substantially no separating performance for separating ions or the like and that is for imparting strength to the separation functional layer which substantially has separating performance.

It is preferable that the substrate is porous. Examples of the substrate include fabrics made of polymers such as polyester-based polymers, polyamide-based polymers, polyolefin-based polymers, or mixtures or copolymers thereof. It is preferable that the substrate is a polyester-based polymer, because a supporting membrane which is excellent in terms of mechanical strength, heat resistance, water resistance, etc. is obtained therewith.

The polyester-based polymers are polyesters each formed from an acid ingredient and an alcohol ingredient. As the acid ingredient, aromatic carboxylic acids such as terephthalic acid, isophthalic acid and phthalic acid, aliphatic dicarboxylic acids such as adipic acid and sebacic acid, alicyclic dicarboxylic acids such as cyclohexanecarboxylic acid, and the like may be used. Examples of the alcohol ingredient include ethylene glycol, diethylene glycol and polyethylene glycol.

Examples of the polyester-based polymers include poly(ethylene terephthalate) resins, poly(butylene terephthalate) resins, poly(trimethylene terephthalate) resins, poly(ethylene naphthalate) resins, poly(lactic acid) resins, and poly(butylene succinate) resins, and further include copolymers of these resins.

As fabric for use as the substrate, it is preferred to employ nonwoven fabric, from the standpoints of strength, ruggedness-forming ability, and fluid permeability. As the nonwoven fabric, use of either long-fiber nonwoven fabric or short-fiber nonwoven fabric is preferred. In particular, long-fiber nonwoven fabric is excellent in terms of penetrability when a solution of a high-molecular-weight polymer is poured onto the nonwoven fabric as a substrate, and is capable of inhibiting the porous support from peeling off and inhibiting the occurrence of troubles, for example, that substrate fluffing or the like results in formation of an uneven composite semipermeable membrane and the occurrence of defects such as pin-holes. Furthermore, since long-fiber nonwoven fabric configured of thermoplastic continuous filaments are less apt to fluff, use of such a long-fiber fabric as the substrate is effective in inhibiting the pouring of a solution of a thermoplastic resin thereonto from causing unevenness or membrane defects. Also in view of the fact that tension is applied to the substrate in the membrane production direction when a composite semipermeable membrane is continuously produced, the long-fiber nonwoven fabric having excellent dimensional stability is preferred as the substrate.

From the standpoints of formability and strength, it is preferable that the long-fiber nonwoven fabric is one in which the fibers in the surface layer on the side opposite to the porous support have been oriented more in the machine direction than the fibers present in the surface layer on the side facing the porous support. This structure not only produces the effect of highly preventing membrane breakage or the like by maintaining strength, but also enables a layered product including the porous support and this substrate to show improved formability when ruggedness is imparted to the separation functional layer, rendering the rugged shape of the surface of the separation functional layer stable. That structure is hence preferred. More specifically, it is preferable that, in the surface layer of the long-fiber nonwoven fabric which is on the side opposite to the porous support, the degree of fiber orientation is 0° to 25°, and that the difference in the degree of fiber orientation between that surface layer and the surface layer on the side facing the porous support is 10° to 90°.

In steps for producing the separation membrane and in steps for producing an element, there are cases where a partly finished separation membrane or the separation membrane is heated. A phenomenon in which the porous support or the separation functional layer contracts upon the heating occurs. Especially in continuous membrane production, the contraction is remarkable in the width direction to which no tension is applied. Since the contraction causes problems concerning dimensional stability, etc., use of a substrate having a low degree of thermal dimensional change is desirable. In cases when the nonwoven fabric is one in which the difference between the degree of fiber orientation in the surface layer on the side opposite to the porous support and the degree of fiber orientation in the surface layer on the side facing the porous support is 10° to 90°, width-direction changes due to heat can be inhibited.

The degree of fiber orientation here is an index showing the direction of the fibers of the nonwoven-fabric substrate, and means the average angle of the fibers constituting the nonwoven fabric, if the direction of membrane production in the case of continuous membrane production is taken as 0° and the direction perpendicular to the direction of membrane production, i.e., the width direction of the nonwoven-fabric substrate, is taken as 90°. Consequently, the closer the degree of fiber orientation to 0°, the more the fibers have been oriented in the machine direction, while the closer the degree of fiber orientation to 90°, the more the fibers have been oriented in the transverse direction.

The degree of fiber orientation is determined in the following manner. Ten small-piece samples are randomly cut out from the nonwoven fabric, and surfaces of the samples are photographed with a scanning electron microscope at a magnification of 100 to 1,000 times. Ten fibers are selected from each sample, and the 100 fibers in total are each examined for angle on the assumption that the lengthwise direction of the nonwoven fabric (machine direction; direction of membrane production) is taken as 0° and the width direction of the nonwoven fabric (transverse direction) is taken as 90°. An average value of these angles is rounded off to the nearest whole number, thereby determining the degree of fiber orientation.

The composition of the porous support is not particularly limited. It is, however, preferable that the porous support is formed of a thermoplastic resin. The term "thermoplastic resin" herein means a resin which is made of linear polymeric substances and which, upon heating, shows the property of deforming or flowing by the action of external force.

Examples of the thermoplastic resin include homopolymers or copolymers of polysulfones, polyethersulfones, polyamides, polyesters, cellulosic polymers, vinyl polymers, poly(phenylene sulfide), poly(phenylene sulfide sulfone)s, poly(phenylene sulfone) and poly(phenylene oxide), and these polymers can be used either alone or as a blend thereof. Usable as the cellulosic polymers are cellulose acetate, cellulose nitrate, and the like. Usable as the vinyl polymers are polyethylene, polypropylene, poly(vinyl chloride), polyacrylonitrile, and the like. Preferred of those are homopolymers or copolymers of polysulfones, polyamides, polyesters, cellulose acetate, cellulose nitrate, poly(vinyl chloride), polyacrylonitrile, poly(phenylene sulfide), and poly(phenylene sulfide sulfone)s.

More preferred examples thereof include cellulose acetate, polysulfones, poly(phenylene sulfide sulfone)s, chlorinated vinyl chloride-based resins, and poly(phenylene sulfone). Of these materials, polysulfones and chlorinated vinyl chloride-based resins can be generally used because they are highly stable chemically, mechanically, and thermally and are easy to mold. It is preferable that the porous support includes any of those enumerated compounds as a main component.

Specifically, a porous support which includes a polysulfone containing repeating units represented by the following chemical formula is preferred because pore-diameter control is easy and this porous support has high dimensional stability.

[Chem. 1]

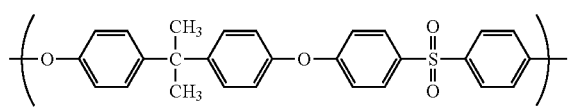

For example, an N,N-dimethylformamide (hereinafter referred to as DMF) solution of the polysulfone is cast on a substrate in a certain thickness and then subjected to wet coagulation in water. Thus, a supporting membrane in which most of the surface thereof has fine pores with a diameter of 1 to 30 nm can be obtained.

It is preferable that the porous support includes at least one vinyl chloride-based resin. Vinyl chloride-based resins are highly stable chemically, mechanically, and thermally. Vinyl chloride-based resins further produce the effect of rendering pore-diameter control of the porous support easy.

The vinyl chloride-based resin may be a chlorinated vinyl chloride-based resin. The chlorinated vinyl chloride-based resin may be a polymer produced from a monomer obtained by chlorinating a vinyl chloride-based monomer, or may be one produced by polymerizing a vinyl chloride-based monomer and then chlorinating this polymer.

Examples of the vinyl chloride-based resin include: a homopolymer of vinyl chloride (i.e., vinyl chloride homopolymer); a copolymer of a vinyl chloride monomer and a monomer having an unsaturated bond copolymerizable with the vinyl chloride monomer (preferably, the copolymer contains 50% or more units derived from the vinyl chloride monomer); and a graft copolymer obtained by graft-copolymerizing a vinyl chloride monomer with a polymer. The porous support may include only one vinyl chloride-based resin among these vinyl chloride-based resins, or may include two or more vinyl chloride-based resins among these.

Examples of the monomer having an unsaturated bond copolymerizable with the vinyl chloride monomer include: α-olefins such as ethylene, propylene and butylene; vinyl esters such as vinyl acetate and vinyl propionate; vinyl ethers such as butyl vinyl ether and cetyl vinyl ether; aromatic vinyls such as styrene and α-methylstyrene; halogenated vinyls such as vinylidene chloride and vinylidene fluoride; N-substituted maleimides such as N-phenylmaleimide and N-cyclohexylmaleimide; maleic anhydride; and acrylonitrile. The porous support may contain only one of these monomers, or may contain two or more of these monomers.

Examples of the polymer with which vinyl chloride is graft-copolymerized include ethylene/vinyl acetate copolymers, ethylene/vinyl acetate/carbon monoxide copolymers, vinyl acetate/poly(vinyl alcohol) copolymers, vinyl acetate/ethylene copolymers, vinyl acetate/maleic anhydride copolymers, ethylene/propylene copolymers, acrylonitrile/butadiene copolymers, polyurethanes, chlorinated polyethylene, and chlorinated polypropylene. The porous support may include one of these polymers, or may include two or more of these polymers.

Processes for producing the vinyl chloride-based resin are not particularly limited, and any of conventionally known polymerization methods can be utilized. Examples thereof include the bulk polymerization method, solution polymerization method, emulsion polymerization method, and suspension polymerization method.

<Polymerization Degree of the Vinyl Chloride-Based Resin>

The polymerization degree of the vinyl chloride-based resin contained in the porous support is, for example, preferably 400 to 1,100, more preferably 500 to 1,000. In cases when the polymerization degree of the vinyl chloride-based resin is 400 or higher, a suitable viscosity can be imparted to a resin solution for forming the porous support and, hence, the porous support can be easily formed. In addition, in cases when the polymerization degree of the vinyl chloride-based resin is 400 or higher, a porous support having suitable strength can be obtained. Meanwhile, in cases when the polymerization degree thereof is 1,100 or lower, the resin solution for forming the porous support can be inhibited from having too high a viscosity and, hence, the water treatment membrane produced can be inhibited from having air bubbles remaining therein.

The polymerization degree herein means a value determined in accordance with JIS K 6720-2 (corresponding to ISO 1060-2: 1998). Specifically, the vinyl chloride-based resin is dissolved in tetrahydrofuran (THF), and the insoluble matter is removed by filtration. Thereafter, the THF in the filtrate is removed by drying. The resin thus obtained is examined for specific viscosity. Since there is a known relationship between the specific gravity and the polymerization degree, the polymerization degree can be determined on the basis of the specific viscosity.

The polymerization degree can be regulated so as to be within the above-mentioned range, by regulating known conditions in the polymerization, such as reaction time and reaction temperature.

Processes for producing the vinyl chloride-based resin (in other words, methods for polymerizing monomer(s)) are not limited to specific methods, and any of conventionally known polymerization methods can be utilized. Examples of processes for producing the vinyl chloride-based resin include the bulk polymerization method, solution polymerization method, emulsion polymerization method, and suspension polymerization method.

<Chlorine Content Ratio of the Vinyl Chloride-Based Resin>

The chlorine content ratio of the vinyl chloride-based resin in the porous support is, for example, preferably 60 to 75%, more preferably 62 to 70%.

Each vinyl chloride monomer unit can have one chlorine atom. The term "chlorine content ratio" means the ratio of chlorinated vinyl chloride monomer units in the vinyl chloride monomer units contained in the vinyl chloride-based resin. Namely, in cases when the chlorine content ratio is 100%, all the vinyl chloride monomer units each have a chloride atom added. In cases when the chlorine content ratio is 50%, 50% of the vinyl chloride monomer units each have a chlorine atom added.

The higher the chlorine content ratio of the vinyl chloride-based resin, the higher the polarity of the resin. The increased polarity results in an increase in the solubility of the resin in the polar solvent which is the solvent of a membrane-forming solution, and simultaneously results in acceleration of solvent exchange in a coagulation water tank. As a result, instantaneous phase separation occurs to form a spongy dense layer, and a membrane having high strength is hence formed.

In cases when the chlorine content ratio of the vinyl chloride-based resin is 60% or higher, sufficient heat resistance and durability can be obtained. In cases when the chlorine content ratio of the vinyl chloride-based resin is 75% or lower, this resin is easy to mold and can be easily produced because the steric repulsion of chlorine atoms is diminished.

Methods for chlorination are not limited to specific methods, and use can be made of methods known in this field, such as the methods described in JP-A-9-278826, JP-A-2006-328165, and International Publication WO/2008/62526. Specifically, examples thereof include a method in which the bonds and chlorine atoms of the vinyl chloride-based resin are excited by heat to accelerate chlorination (hereinafter referred to as thermal chlorination), a method in which the resin is irradiated with light to accelerate chlorination by means of a photoreaction (hereinafter referred to as photo-chlorination), and a method in which the resin is irradiated with light while being heated.

The chlorination by thermal chlorination is preferred in that the resin can be more evenly chlorinated and, hence, a chlorinated vinyl chloride-based resin having high thermal stability can be obtained. In addition, by utilizing the chlorination by thermal chlorination, components having a low glass transition point, among the components contained in the vinyl chloride-based resin, can be diminished. As a result, when the polymeric water treatment membrane obtained is used at high temperatures, the occurrence of pore clogging can be minimized.

An aqueous-suspension thermal chlorination method is conducted, for example, in the following manner. Pure water and either a vinyl chloride-based monomer or a vinyl chloride-based resin are introduced into a reactor equipped with a stirrer and a jacket. Thereafter, the air within the reactor is discharged with a vacuum pump, and the inside of the reactor is heated with the jacket while stirring. After a predetermined temperature has been reached, chlorine is introduced into the reactor. Thus, the vinyl chloride-based resin can be chlorinated.

The material of the reactor for the aqueous-suspension thermal chlorination method is not particularly limited. However, reactors in which a measure for anticorrosion, e.g., glass lining, has been taken are suitable from the standpoint of inhibiting corrosion due to chlorine and hydrogen chloride.

The reaction temperature in the aqueous-suspension thermal chlorination method is preferably 70 to 130° C. In cases when the reaction temperature is 70° C. or higher, a moderately high chlorination reaction rate can be obtained. In cases when the reaction temperature is 130° C. or lower, the resin can be inhibited from suffering thermal deterioration and the resultant discoloration. More preferably, the reaction temperature is 90 to 120° C. Temperature control may be performed in multiple stages, for example, in such a manner that the reaction temperature is changed during the reaction in accordance with the progress of the reaction.

The reaction pressure in the aqueous-suspension thermal chlorination method is not particularly limited. However, higher pressures within the range of pressures which the reactor is designed to withstand are preferred since the higher the chlorine concentration in the reaction system, the more the chlorination reaction is apt to proceed.

Examples of the method in which chlorination is accelerated by a photoreaction include a method in which a vinyl chloride-based monomer or a vinyl chloride-based resin is brought, in a suspension state or the like, into contact with chlorine while irradiating with ultraviolet rays or with visible light from a mercury lamp, arc lamp, incandescent lamp, fluorescent lamp, carbon arc lamp, or the like.

The chlorine content ratio can be regulated by suitably regulating the reaction conditions described above, etc.

Preferred as the vinyl chloride-based resin, among those shown above, is a homopolymer of vinyl chloride (vinyl chloride homopolymer) or a chlorinated homopolymer of vinyl chloride.

For example, an N,N-dimethylformamide (hereinafter referred to as DMF) solution of the vinyl chloride-based resin is cast on a substrate in a certain thickness and then subjected to wet coagulation in water. Thus, a supporting membrane in which most of the surface thereof has fine pores with a diameter of 1 to 30 nm can be obtained.

It is preferable that the porous support includes an inner layer and a surface layer. The inner layer of the porous support serves to transport an aqueous solution of a polyfunctional amine, which is necessary for forming the separation functional layer, to a field of polymerization. It is preferable that the inner layer has continuous pores, from the standpoint of efficiently transporting the monomers, and it is preferable that the pore diameter thereof is 0.1 to 1 μm.

The surface layer of the porous support functions as a field of polymerization, and retains and releases the monomers. The surface layer thus serves to supply the monomers to the separation functional layer which is being formed, and further serves to provide sites where pleats of the separation functional layer begin to grow.

Furthermore, it is preferable in the porous support that the inner layer and the surface layer have a continuous structure. The term "continuous structure" means a structure in which no skin layer has been formed at the interface. The term "skin layer" herein means a portion having a high density. Specifically, the skin layer has surface pores having a size in the range of 1 to 50 nm.

It is preferable that that portion of the porous support which lies on the substrate has a density of 0.3 to 0.7 g/cm$^3$ and a porosity of 30 to 70%. In cases when the portion of the porous support layer which lies on the substrate has a density of 0.3 g/cm$^3$ or higher or porosity of 30% or higher, not only suitable strength is obtained but also it is possible to obtain a surface structure suitable for the growth of pleats of the polyamide separation functional layer. Meanwhile, in cases when the portion of the porous support layer which lies on the substrate has a density of 0.7 g/cm$^3$ or less or a porosity of 70% or less, satisfactory water permeability can be obtained.

Some of the porous support is present in the substrate, thereby serving to tenaciously adhere the substrate and the porous support to each other and to support the porous support. Specifically, this state is as shown in the example shown in FIG. 1.

The composite semipermeable membrane 1 shown in FIG. 1 includes a supporting membrane 2 and a separation functional layer 5. The supporting membrane 2 includes a substrate 3 and a porous support 4. With respect to the composition, etc. of the substrate 3 and the porous support 4, the configurations described above are applied. As shown in FIG. 1, some of the porous support 4 is present in the substrate 3. For reasons of convenience, the porous support which is present on the substrate (between the substrate and the separation functional layer 5) is indicated by numeral 40, and the porous support which is present in the substrate is indicated by numeral 41. Furthermore, the layer configured of the substrate 3 and the porous substrate 41 which is present in the substrate (i.e., the layer which remains after the porous support 40 which is present on the substrate is removed from the supporting membrane 2) is referred to as composite substrate and indicated by numeral 42. In this description, the mere wording "substrate" does not include the porous support which is present in the substrate, unless otherwise indicated.

In particular, in cases when the porosity of the substrate is 35 to 80%, the amount of the porous support in the substrate is controlled satisfactorily and both strength and water permeability can be attained.

In cases when the porosity of the substrate is 35% or higher, raw material solution for forming the porous support is sufficiently impregnated into the substrate, thereby giving a supporting membrane in which some of the resin of the porous support is present in the substrate. An appropriate peel strength is hence obtained. It is thought that the degree in which the resin that is a constituent component of the porous support is impregnated into the substrate in producing the supporting membrane is affected by the porosity of the substrate and is affected also by the viscosity of the resin solution used for forming the porous support. In general, however, in the case where a porous support having a density (porosity) capable of rendering separating performance possible has been laminated with a substrate, that is, in the case where a porous support has been formed using a resin solution having a certain degree of concentration, the amount of the porous support present in the substrate is mainly affected by the porosity of the substrate. The porosity thereof may be 40% or higher, or 50% or higher.

In cases when the porosity of the substrate is 80% or less, the amount of the porous support present in the substrate is prevented from being too large and is regulated to a proper amount. As a result, when a separation functional layer of a polyamide or the like is formed by polymerization, a suitable balance between the rate of monomer feeding to the field of polymerization and the progress of the polymerization is maintained, and the membrane obtained exhibits a satisfactory solute removal ratio. Another effect brought about by the porosity of 80% or less is that interstices among the fibers of the substrate, which serve as channels for permeate, remain adequately and there are hence cases where a high water production rate can be obtained. The porosity of the substrate may be 75% or less, or 70% or less, or 65% or less.

The term "porosity" herein means the proportion of interstices per unit volume of the fabric. The porosity can be obtained by impregnating the substrate having a given apparent volume with pure water, subtracting the weight of the substrate in a dry state from the weight of the water-impregnated substrate, dividing the resulting difference by the apparent volume of the substrate, and expressing the resulting quotient in terms of percentage (%).

The sum (A+B) of a weight A which is a weight of the substrate per unit area and a weight B which is a weight of the portion of the porous support which is located within the substrate per unit area is 30 g/m$^2$ or greater. Meanwhile, the sum (A+B) is 100 g/m$^2$ or less.

The sum (A+B) is obtained by removing the portion of the porous support which is present on the substrate from the supporting membrane, measuring the weight of the resultant composite (corresponding to "composite substrate") composed of the substrate and the portion of the porous support which remains in the substrate, and dividing the weight by the area of the composite substrate. In other words, this sum can be called the basis weight of the composite substrate. Some of the porous support remains in the composite substrate. In cases when the basis weight of the composite substrate is 30 g/m$^2$ or greater, a high peel strength is obtained. Meanwhile, in cases when the basis weight of the composite substrate is 100 g/m$^2$ or less, flow resistance is rendered low.

The ratio of weight B to weight A, B/A, satisfies 0.10<B/A<0.60. In cases when the ratio B/A is 0.10 or larger, the substrate and the porous support are composited with each other and a high peel strength can be obtained. Meanwhile, in cases when the ration B/A is 0.60 or smaller, flow resistance is rendered low.

It is more preferable that the weight A of the substrate and the weight B of the portion of the porous support which is located in the substrate satisfy the respective preferred numerical ranges shown above and simultaneously satisfy the above-mentioned relational expression.

So long as the thickness of the portion of the composite substrate which has been impregnated with the porous support is 60% or more of the thickness of the substrate, not only a high peel strength is obtained but also the composite semipermeable membrane can be rendered less apt to sink into the channel member when used to fabricate a separation membrane element. In case where the thickness of the impregnated portion of the porous support exceeds 99% of the thickness of the substrate, a skin layer is formed also on the back side and this is causative of a decrease in water permeability. Consequently, in cases when the thickness thereof is 99% or less of the thickness of the substrate, both strength and water permeability can be attained. Incidentally, control of thickness of the impregnated portion is affected by the porosity of the substrate and is affected also by the viscosity of the resin solution used for forming the porous support. The viscosity of the resin solution can be controlled by regulating the temperature of the solution which is being applied or the concentration of the resin solution. It is desirable that the resin solution having a temperature in the range of usually 0 to 50° C. is applied.

The concentration of the resin solution, although changeable in accordance with the kind of the resin, etc., is preferably in the range of 5 to 35% by weight, more preferably in the range of 10 to 25% by weight. So long as the concentration thereof is within that range, the organic-solvent solution containing a resin is sufficiently impregnated into interstices among the fibers of the substrate while avoiding precipitation of the solution of the resin. As a result, the porous support is tenaciously bonded to the substrate by the anchoring effect. Incidentally, the temperature range of the resin solution may be regulated in accordance with the viscosity of the polymer solution to be used, etc.

With respect to the total porosity of the impregnated portion of the porous support into the substrate, it is preferable that the total porosity thereof is 10% or higher but 60% or less, provided that the respective preferred numerical ranges shown above are satisfied.

In accordance with the configuration described above, the thickness of the portion of the porous support 4 which is impregnated into the substrate (the thickness of the portion indicated by numeral 41) and the quantitative relationship between the substrate 3 and the porous support 41 in the porous support/substrate composite can be optimized. Thus, the strength of peeling between the substrate 3 and the porous support 41 can be heightened and, as a result, the performance can be inhibited from decreasing even when the operation pressure fluctuates.

The thickness of the supporting membrane 2 affects the strength of the composite semipermeable membrane and the packing density thereof in a membrane element including the composite semipermeable membrane. From the standpoint of obtaining sufficient mechanical strength and packing density, the thickness of the supporting membrane 2 is preferably in the range of 30 to 300 μm, more preferably in the range of 50 to 250 μm.

Meanwhile, the thickness of the portion of the porous support which is present on the substrate is preferably 1 to 80%, more preferably 5 to 50%, of the thickness of the substrate.

The thickness of the substrate is preferably in the range of 10 to 200 μm, more preferably in the range of 40 to 150 μm.

Adhesion between the substrate and the porous support varies depending on the material of the substrate used, etc. However, the peel strength in a peel test (temperature condition of 25° C.; 10 mm/min) may be 0.5 N/25 mm or greater, preferably 1.0 N/25 mm or greater. An upper limit of the peel strength cannot be specified because there are cases where the peel strength exceeds the fracture strength of the porous support. However, an upper limit at which the porous support can be peeled off without breaking is usually less than 7.5 N/25 mm.

It is preferable that contact between the membrane-forming raw material solution (i.e., resin solution) for forming the porous support and a nonsolvent for coagulating the membrane-forming raw material solution is conducted evenly and continuously on the surface of the porous support. Specifically, examples thereof include a method in which a porous support obtained by coating a substrate with the raw material solution is immersed in a coagulation bath including a nonsolvent.

Examples of coating methods include a method in which the membrane-forming raw material solution is applied to the substrate using a coating device such as a spin coater, wire-wound bar, flow coater, die coater, roll coater, or sprayer.

(1-2) Separation Functional Layer

The separation functional layer is a layer which, in the composite semipermeable membrane, performs the function of separating a solute. The configurations of the separation functional layer, such as the composition, thickness, etc., are set in accordance with the intended use of the composite semipermeable membrane.

(Separation Functional Layer Made of Polyamide)

As described above, there are cases where conventional membranes decrease in performance as a result of use. In this connection, the present inventors have discovered, as a result of investigations diligently made thereby, that in a crosslinked-polyamide separation functional layer disposed on the porous support, the weight of the separation functional layer per unit area of the semipermeable membrane is preferably 50 to 250 mg/m$^2$, more preferably 80 to 200 mg/m$^2$. In cases when the weight of the separation functional layer is within that range, the composite semipermeable membrane is inhibited from decreasing in performance. This is thought to be because projections in the separation functional layer have grown high and, hence, the separation functional layer in the composite semipermeable membrane shows improved durability concerning resistance to physical external force due to impacts, abrasion, etc.

The average weight of the separation functional layer is a value obtained in the following manner. First, the composite semipermeable membrane is cut to obtain a piece of 50 cm×100 cm. The substrate in this piece is peeled from the porous support to thereby obtain a composite composed of the porous support and the separation functional layer disposed thereon. The composite obtained is introduced into dichloromethane, and is stirred. Thus, the porous support only is dissolved away. The mixture obtained is filtrated under vacuum using a membrane filter made of PTFE (product name T300A090C, manufactured by ADVANTEC; pore diameter, 3 μm). As a result, the separation functional layer remains on the filter. The separation functional layer recovered is introduced again into dichloromethane and purified by the procedure shown above. This operation is repeatedly performed five times. Thus, the separation functional layer only can be recovered. The separation functional layer recovered is dried in a vacuum oven for 24 hours and then subjected to a weight measurement. Thus, the average weight (mg/m$^2$) of the separation functional layer is determined.

The separation functional layer may include, for example, a polyamide as a main component. The polyamide for constituting the separation functional layer can be formed by interfacial polycondensation of a polyfunctional amine with a polyfunctional acid halide. It is preferable that at least one of the polyfunctional amine and the polyfunctional acid halide includes a compound having a functionality of 3 or higher.

The term "polyfunctional amine" herein means an amine which has two or more primary amino and/or secondary amino groups in the molecule and in which at least one of the amino groups is a primary amino group. Examples thereof include aromatic polyfunctional amines such as phenylenediamines and xylylenediamines in which the two amino groups have been bonded to the benzene ring in ortho, meta, or para positions thereof, 1,3,5-triaminobenzene, 1,2, 4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine and 4-aminoethylpiperazine. Preferred of these, from the standpoints of the separation selectivity, permeability, and heat resistance of the membrane, are the aromatic polyfunctional amines having two to four primary amino and/or secondary amino groups in the molecule. Suitable for use as such polyfunctional aromatic amines are m-phenylenediamine, p-phenylenediamine, and 1,3,5-triaminobenzene. More preferred of these is m-phenylenediamine (hereinafter referred to as m-PDA) from the standpoints of availability and handleability. Those polyfunctional amines may be used either alone or in combination of two or more thereof. In the case of using a combination of two or more polyfunctional amines, two or more of the amines shown above may be used in combination, or any of the amines shown above may be used in combination with an amine having at least two secondary amino groups in the molecule. Examples of the amine having at least two secondary amino groups in the molecule include piperazine and 1,3-bispiperidylpropane.

The term "polyfunctional acid halide" means an acid halide which has at least two halogenocarbonyl groups in the molecule. Examples of trifunctional acid halides include trimesoyl chloride, 1,3,5-cyclohexanetricarbonyl trichloride, and 1,2,4-cyclobutanetricarbonyl trichloride. Examples of bifunctional acid halides include aromatic bifunctional acid halides such as biphenyldicarbonyl dichloride, azobenzenedicarbonyl dichloride, terephthaloyl chloride, isophthaloyl chloride and naphthalenedicarbonyl chloride; aliphatic bifunctional acid halides such as adipoyl chloride and sebacoyl chloride; and alicyclic bifunctional acid halides such as cyclopentanedicarbonyl dichloride, cyclohexanedicarbonyl dichloride and tetrahydrofurandicarbonyl dichloride. When reactivity with the polyfunctional amines is taken into account, it is preferable that the polyfunctional acid halides are polyfunctional acid chlorides. When the separation selectivity and heat resistance of the membrane are taken into account, it is more preferable that the polyfunctional acid chlorides are polyfunctional aromatic acid chlorides each having two to four chlorocarbonyl groups in the molecule. Even more preferred is to use trimesoyl chloride, among these, from the standpoints of availability and handleability. Those polyfunctional acid halides may be used alone, or two or more thereof may be simultaneously used.

(Organic/Inorganic Hybrid Separation Functional Layer)

The separation functional layer may have an organic/inorganic hybrid structure having an Si element, etc. The separation functional layer having an organic/inorganic hybrid structure can include, for example, the following compounds (A) and (B):

(A) a silicon compound containing silicon atoms to which both a reactive group having an ethylenically unsaturated group and a hydrolyzable group have been directly bonded; and (B) a compound which is not the compound (A) shown above and which has an ethylenically unsaturated group. Specifically, the separation functional layer may include a product of the condensation of the hydrolyzable group of compound (A) and a product of the polymerization of the ethylenically unsaturated group(s) of compound (A) and/or compound (B). Namely, the separation functional layer can include at least one polymer selected from among:

a polymer formed by the condensation and/or polymerization of compound (A) alone;

a polymer formed by the polymerization of compound (B) alone; and a copolymer of compound (A) with compound (B).

The polymers include condensates. In the copolymer of compound (A) with compound (B), the compound (A) may have been condensed via the hydrolyzable group.

The hybrid structure can be formed by known methods. One example of methods for forming the hybrid structure is as follows. A liquid reaction mixture containing compound (A) and compound (B) is applied to a porous support. The excess liquid reaction mixture is removed, and the hydrolyzable group is then condensed. This condensation may be attained by a heat treatment. As a method for polymerizing the ethylenically unsaturated groups of the compound (A) and compound (B), use may be made of a heat treatment, electromagnetic-wave irradiation, electron-beam irradiation, or plasma irradiation. For the purpose of heightening the rate of polymerization, a polymerization initiator, polymerization accelerator, or the like can be added when the separation functional layer is formed.

With respect to each of such separation functional layers, the surface of the membrane may be hydrophilized before use, for example, with an aqueous solution containing an alcohol or an aqueous alkali solution.

2. Process for Producing the Composite Semipermeable Membrane

Next, a process for producing the composite semipermeable membrane is explained. The production process includes a step for forming a supporting membrane and a step for forming a separation functional layer. The composite semipermeable membrane of the present invention is not limited by the production process described herein or by the methods for forming individual layers described herein.

(2-1) Step for Forming Supporting Membrane

The step for forming a supporting membrane may include: a step in which a solution of a thermoplastic resin which is a component of the porous support is applied to a substrate; and a step in which the substrate coated with the solution is immersed in a coagulation bath having a lower solubility of the thermoplastic resin than that of good solvents for the thermoplastic resin, thereby coagulating the thermoplastic resin to form a three-dimensional network structure. The step for forming a supporting membrane may further include a step in which the thermoplastic resin which is a component of the porous support is dissolved in a good solvent for the thermoplastic resin to prepare a thermoplastic-resin solution.

In the present invention, the supporting membrane has a structure including the substrate and the porous support formed in the substrate and on one or both surfaces of the substrate. Such structure can be formed by applying a solution of a thermoplastic resin to a substrate or by immersing a substrate in a solution of a thermoplastic resin.

The application of a solution of a thermoplastic resin to a substrate can be conducted by various coating techniques. It is, however, preferred to employ a pre-metering coating technique capable of feeding the coating solution in an accurate amount, such as die coating, slide coating, or curtain coating. Furthermore, for forming the supporting membrane according to the present invention, it is more preferred to use a slit die method for applying the solution of a thermoplastic resin.

In the case where the solution of a thermoplastic resin for forming the macroporous supporting membrane contains a polysulfone as a material for the porous support, the polysulfone concentration (i.e., solid concentration) of the thermoplastic-resin solution is preferably 15% by weight or higher, more preferably 17% by weight or higher. Meanwhile, the polysulfone concentration of the thermoplastic-resin solution is preferably 30% by weight or less, more preferably 25% by weight or less. In cases when the polysulfone concentration thereof is 15% by weight or higher, an aqueous amine solution, when a polyamide separation functional layer is formed, can be supplied via the pores formed by phase separation. Meanwhile, in cases when the polysulfone concentration thereof is 30% by weight or less, a structure having water permeability can be obtained. Polysulfone concentrations within that range are preferred from the standpoints of the performance and durability of the composite semipermeable membrane.

With respect to the temperature of the thermoplastic-resin solution at the time when the thermoplastic-resin solution is applied, it is desirable that the solution is applied usually at a temperature in the range of 10 to 60° C., when a polysulfone is used therein. So long as the temperature thereof is within that range, the thermoplastic-resin solution does not suffer precipitation and the organic solvent solution containing the thermoplastic resin is solidified after having been sufficiently impregnated into interstices among the fibers of the substrate. As a result, due to the impregnation, the porous support is tenaciously bonded to the substrate, and the supporting membrane according to the present invention can be obtained. A preferred range of the temperature of the thermoplastic-resin solution may be suitably regulated in accordance with the viscosity of the thermoplastic-resin solution to be used, etc.

The polymer contained in the thermoplastic-resin solution can be suitably regulated while taking account of various properties, such as the strength characteristics, permeation characteristics, and surface properties of the supporting membrane to be produced.

The solvents contained in the thermoplastic-resin solutions may be the same or different, so long as the solvents are good solvents for the polymers. The solvents can be suitably regulated while taking account of the strength characteristics of the supporting membrane to be produced and the impregnation of the thermoplastic-resin solution into the substrate.

The term "good solvent" in the present invention means a solvent capable of dissolving the polymeric materials. Examples of the good solvent include N-methyl-2-pyrrolidone (NMP), tetrahydrofuran, dimethyl sulfoxide, amides such as tetramethylurea, dimethylacetamide and dimethylformamide, lower-alkyl ketones such as acetone and methyl ethyl ketone, esters and lactones such as trimethyl phosphate and γ-butyrolactone, and mixed solvents thereof.

Examples of non-solvents for the polymers include: water; aliphatic hydrocarbons, aromatic hydrocarbons and aliphatic alcohols, such as hexane, pentane, benzene, toluene, methanol, ethanol, trichloroethylene, ethylene glycol, diethylene glycol, triethylene glycol, propylene glycol, butylene glycol, pentanediol, hexanediol, and low-molecular-weight polyethylene glycol; or mixed solvents thereof.

The thermoplastic-resin solution may contain additives for regulating the pore diameter, porosity, hydrophilicity, elastic modulus, etc. of the porous support. Examples of additives for regulating pore diameter and porosity include water, alcohols, water-soluble polymers such as polyethylene glycol, polyvinylpyrrolidone, poly(vinyl alcohol) and poly(acrylic acid) or salts thereof, inorganic salts such as lithium chloride, sodium chloride, calcium chloride and lithium nitrate, formaldehyde and formamide. However, the additives are not limited to these examples. Examples of additives for regulating hydrophilicity or elastic modulus include various surfactants.

By applying the thermoplastic-resin solution to a substrate in the manner described above, the thermoplastic-resin solution is impregnated into the substrate. It is, however, necessary for obtaining a supporting membrane having the predetermined structure that the impregnation of the thermoplastic-resin solution into the substrate should be controlled. Examples of methods for controlling the impregnation of the thermoplastic-resin solution into the substrate include a method in which the time period from the application of the thermoplastic-resin solution to the substrate to immersion in a coagulation bath is controlled and a method in which the temperature or concentration of the thermoplastic-resin solution is controlled to thereby regulate the viscosity thereof. It is also possible to use these methods in combination.

The time period from the application of the thermoplastic-resin solution to the substrate to immersion in a coagulation bath is usually preferably in the range of 0.1 to 5 seconds. So long as the time period to the immersion in a coagulation bath is within this range, the thermoplastic-resin solution is solidified after having been sufficiently impregnated into interstices among the fibers of the substrate. Incidentally, such a preferred range of the time period to the immersion in a coagulation bath may be suitably regulated in accordance with the viscosity of the thermoplastic-resin solution to be used, etc.

As the coagulation bath, water is usually used. However, use may be made of any bath in which the polymers do not dissolve. The configuration of the supporting membrane varies depending on the composition thereof, and the membrane-forming properties of the composite semipermeable membrane also change accordingly. The temperature of the coagulation bath is preferably −20° C. to 100° C., more preferably 10 to 30° C. So long as the temperature thereof is not higher than the above-mentioned upper limit, the vibration of the surface of the coagulation bath due to thermal motion does not become severe and the surface of the membrane formed has satisfactory smoothness. Meanwhile, so long as the temperature thereof is not lower than the above-mentioned lower limit, a sufficient coagulation rate can be obtained and satisfactory membrane-forming properties are attained.

Next, the supporting membrane obtained is preferably cleaned with hot water in order to remove the membrane formation solvent remaining in the membrane. The temperature of this hot water is preferably 50 to 100° C., more preferably 60 to 95° C. In case where the temperature thereof is higher than this range, the supporting membrane contracts to a higher degree, resulting in a decrease in water permeability. Conversely, in case where the temperature thereof is too low, the cleaning effect is insufficient.

(2-2) Step for Forming Separation Functional Layer

Next, formation of a separation functional layer including a polyamide as a main component is explained as an example of the step for forming a separation functional layer which is a constituent component of the composite semipermeable membrane. In the step for forming a polyamide separation functional layer, an aqueous solution containing the polyfunctional amine described above and an organic-solvent solution which contains the polyfunctional acid halide and is immiscible with water are subjected to interfacial polycondensation on the surface of the supporting membrane. Thus, a polyamide framework can be formed.

The concentration of the polyfunctional amine in the polyfunctional amine aqueous solution is preferably in the range of 0.1 to 20% by weight, more preferably in the range of 0.5 to 15% by weight. In cases when the concentration thereof is within that range, it is possible to obtain sufficient water permeability and the sufficient ability to remove salts and boron. The polyfunctional amine aqueous solution may contain a surfactant, organic solvent, alkaline compound, antioxidant, and the like, so long as these ingredients do not inhibit the reaction between the polyfunctional amine and the polyfunctional acid halide. Surfactants have an effect of improving the wettability of the surface of the supporting membrane and reducing interfacial tension between the aqueous amine solution and the nonpolar solvent. Since some organic solvents act as a catalyst for interfacial polycondensation reactions, there are cases where addition of an organic solvent enables the interfacial polycondensation reaction to be performed efficiently.

In order to perform the interfacial polycondensation on the supporting membrane, the polyfunctional amine aqueous solution described above is first brought into contact with the supporting membrane. It is preferable that the aqueous solution is evenly and continuously contacted with the surface of the supporting membrane. Specific examples of methods therefor include a method in which the supporting membrane is coated with the polyfunctional amine aqueous solution and a method in which the supporting membrane is immersed in the polyfunctional amine aqueous solution. The period during which the supporting membrane is in contact with the polyfunctional amine aqueous solution is preferably in the range of 5 seconds to 10 minutes, more preferably in the range of 10 seconds to 3 minutes.

After the polyfunctional amine aqueous solution is brought into contact with the supporting membrane, the excess solution is sufficiently removed so that no droplets remain on the membrane. By sufficiently removing the excess solution, it is rendered possible to prevent a trouble that portions where droplets remain become defects in the resultant composite semipermeable membrane to reduce the removal performance of the composite semipermeable membrane. As a method for removing the excess solution, use can be made, for example, of a method in which the supporting membrane which has been contacted with the polyfunctional amine aqueous solution is held vertically to make the excess aqueous solution flow down naturally or a method in which streams of a gas, e.g., nitrogen, are blown against the supporting membrane from air nozzles to forcedly remove the excess solution, as described in JP-A-2-78428. After the removal of the excess solution, the membrane surface may be dried to remove some of the water contained in the aqueous solution.

Subsequently, an organic-solvent solution which contains a polyfunctional acid halide and is immiscible with water is brought into contact with the supporting membrane which has been contacted with the polyfunctional amine aqueous solution, thereby forming a crosslinked-polyamide separation functional layer through interfacial polycondensation.

The concentration of the polyfunctional acid halide in the water-immiscible organic-solvent solution is preferably in the range of 0.01 to 10% by weight, more preferably in the range of 0.02 to 2.0% by weight. In cases when the concentration of the polyfunctional acid halide is 0.01% by weight or higher, a sufficient reaction rate is obtained. In cases when the concentration thereof is 10% by weight of less, side reactions can be inhibited from occurring. Furthermore, incorporation of an acylation catalyst such as DMF into this organic-solvent solution is more preferred because the interfacial polycondensation is accelerated thereby.

It is desirable that the water-immiscible organic solvent is one in which the polyfunctional acid halide can be dissolved therein and which does not damage the supporting membrane. The organic solvent may be any water-immiscible organic solvent which is inert to both the polyfunctional amine compound and the polyfunctional acid halide. Preferred examples thereof include hydrocarbon compounds such as hexane, heptane, octane, nonane and decane.

For bringing the organic-solvent solution containing a polyfunctional acid halide into contact with the supporting membrane, use may be made of the same method as that used for coating the supporting membrane with the polyfunctional amine aqueous solution.

In the step of interfacial polycondensation, it is important that the surface of the supporting membrane should be sufficiently covered with a crosslinked-polyamide thin film and that the water-immiscible organic-solvent solution containing a polyfunctional acid halide, which has been contacted therewith, should remain on the supporting membrane. For this reason, the period during which the interfacial polycondensation is performed is preferably 0.1 second to 3 minutes, more preferably 0.1 second to 1 minute. In cases when the period during which the interfacial polycondensation is performed is 0.1 second to 3 minutes, the surface of the supporting membrane can be sufficiently covered with a crosslinked-polyamide thin film and the organic-solvent solution containing a polyfunctional acid halide can be held on the supporting membrane.

After a polyamide separation functional layer is formed on the supporting membrane by the interfacial polycondensation, the excess solvent is removed. For removing the excess solvent, use can be made, for example, of a method in which the membrane is held vertically to remove the excess organic solvent by allowing the solvent to flow down naturally.

Furthermore, in the present invention, the polyamide separation functional layer formed may be brought into contact with an amine-reactive reagent. This step reduces the content of amine groups in the polyamide, and the chemical resistance of the composite semipermeable membrane can be further improved thereby. Examples of the amine-reactive reagent include acid halides, acid anhydrides, esters, nitrosyl compounds, nitrous acid and salts thereof, and hypochlorous acid salts. It is especially preferred to bring the polyamide separation functional layer into contact with a compound which reacts with primary amino groups of the polyamide separation functional layer to yield a diazonium salt or a derivative thereof, the compound being any of nitrosyl compounds, nitrous acid, and salts thereof.

Methods by which the compound that reacts with primary amino groups to yield a diazonium salt or a derivative thereof is brought into contact with the polyamide separation functional layer are not particularly limited so long as the surface of the separation functional layer comes into contact with the compound. Various known methods can be used.

It is preferable in the present invention that the compound which reacts with primary amino groups to yield a diazonium salt or a derivative thereof is used as an aqueous solution. Since aqueous solutions of a nitrosyl compound or of nitrous acid are prone to decompose to evolve a gas, it is preferred to sequentially yield nitrous acid, for example, by reacting a nitrous acid salt with an acidic solution. In general, nitrous acid salts react with hydrogen ions to yield nitrous acid and this formation of nitrous acid is efficient when the pH of the aqueous solution at 20° C. is 7 or less, preferably 5 or less, more preferably 4 or less. Especially preferred of those solutions is an aqueous sodium nitrite solution obtained by reacting with hydrochloric acid or sulfuric acid in aqueous solution, from the standpoint of handleability.

The concentration of the nitrous acid or nitrous acid salt in the solution of a compound which reacts with primary amino groups to yield a diazonium salt or a derivative thereof is preferably in the range of 0.01 to 1% by weight at 20° C. In case where the concentration thereof is lower than 0.01% by weight, a sufficient effect is not obtained. In case where the concentration of the nitrous acid or nitrous acid salt is higher than 1% by weight, it is difficult to handle the solution.

The temperature of the aqueous nitrous acid solution is preferably 15 to 45° C. In case where the temperature thereof is below 15° C., the reaction takes much time. In case where the temperature thereof exceeds 45° C., the nitrous acid decomposes too quickly and the solution is difficult to handle. The period during which the aqueous nitrous acid solution is in contact with the primary amino groups may be any period sufficient for yielding a diazonium salt; high concentrations enable the treatment to be carried out in a short period, while low concentrations necessitate a prolonged period for the contact. In case where the solution having a low concentration is used to yield a diazonium salt over a prolonged period, the yielded diazonium salt reacts with the water before reacting with the reactive compound. It is therefore desirable to conduct the treatment at a high concentration in a short period. For example, in the case of an aqueous nitrous acid solution having a concentration of 2,000 mg/L, it is preferred to conduct the treatment for 30 seconds to 10 minutes.

A method for forming the separation functional layer having an organic/inorganic hybrid structure is as described above.

Although the composite semipermeable membrane thus obtained can be used as such, it is preferred to hydrophilize the surfaces of the membrane with, for example, an aqueous solution containing an alcohol or an aqueous alkali solution before use.

3. Use of the Composite Semipermeable Membrane

The composite semipermeable membrane of the present invention is suitable for use as a spiral type composite semipermeable membrane element obtained by winding the composite semipermeable membrane around a cylindrical collecting pipe having a large number of perforations, together with a raw-water channel member such as a plastic net, a permeate channel member such as tricot, and a film optionally used for enhancing pressure resistance. Furthermore, such elements can be connected serially or in parallel and housed in a pressure vessel, thereby configuring a composite semipermeable membrane module.

Moreover, the composite semipermeable membrane, the element thereof, or the module can be combined with a pump for supplying raw water thereto, a device for pretreating the raw water, etc., thereby configuring a fluid separator. By using this separator, raw water can be separated into permeate such as potable water, and a concentrate which has not passed through the membrane. Thus, water suited for a purpose can be obtained.

Higher operation pressures for the liquid separator are effective in improving the salt removal ratio. However, in view of the resultant increase in the amount of energy necessary for the operation and in view of the durability of the composite semipermeable membrane, the operation pressure at the time when water to be treated is passed through the composite semipermeable membrane is preferably 1.0 to 10 MPa. With respect to the temperature of the feed water, the salt removal ratio decreases as the temperature thereof rises. However, as the temperature thereof declines, the membrane permeation flux decreases. Consequently, the temperature thereof is preferably 5 to 45° C. With respect to the pH of the feed water, too high pH values thereof result in a possibility that, in the case of feed water having a high salt concentration, such as seawater, scale of magnesium or the like might occur. There also is a possibility that the membrane might deteriorate due to high-pH operation. Consequently, it is preferable that the separator is operated in a neutral range.

Examples of the raw water to be treated with the composite semipermeable membrane include liquid mixtures having a TDS (total dissolved solids) of 500 mg/L to 100 g/L, such as seawater, brackish water, and wastewater. In general, TDS means the total content of dissolved solids and is expressed in terms of "mass/volume", but there are cases where TDS is expressed in terms of "weight ratio", assuming 1 L as 1 kg. According to a definition, the content can be calculated from the weight of a residue obtained by evaporating, at a temperature of 39.5 to 40.5° C., a solution filtrated through a 0.45-μm filter. However, a simpler method is to convert from practical salinity.

<Notes>

In this description, the term "thickness" used for each layer or for the membrane means an average value unless otherwise indicated. The term "average value" herein means arithmetic average value. Namely, the thickness of each layer and the thickness of the membrane each is determined by examining a cross-section thereof to measure the thickness at 20 points located at intervals of 20 μm along the direction perpendicular to the thickness direction (i.e., direction of the plane of the membrane) and calculating an average of the measured thickness values.

In this description, the expression "X includes Y as a main component" means that Y accounts for at least 60% by weight, or at least 80% by weight, or at least 90% by weight, of X, and includes the case in which X consists substantially of Y.

EXAMPLES

The present invention will be explained below in more detail by reference to Examples, but the invention should not be construed as being limited by the following Examples.

Production of Composite Semipermeable Membranes

Example 1 a. Production of Supporting Membrane

A mixture of a solute (polysulfone: UDEL (registered trademark) p-3500, manufactured by Solvay Advanced Polymers) and a solvent (DMF) was kept being heated at 100° C. with stirring for 2 hours, thereby preparing a raw material solution for porous supports. The concentration of the polysulfone in the raw material solution was 16% by weight.

The raw material solution prepared was cooled to room temperature and was supplied to an extruder and subjected to high-accuracy filtration. Thereafter, the filtrated raw material solution was cast, through a slit die, on a long-fiber nonwoven fabric (fiber diameter: 1 dtex, thickness: about 75.3 μm, weight: 49.5 g/m²) composed of poly(ethylene terephthalate) fibers. Immediately thereafter, the coated nonwoven fabric was immersed in pure water and cleaned for 5 minutes. Thus, a supporting membrane was obtained.

b. Formation of Separation Functional Layer

The supporting membrane obtained was immersed in a 4.0% by weight aqueous solution of m-PDA for 2 minutes and then slowly pulled up while keeping the membrane surfaces vertical. Nitrogen was blown thereagainst from an air nozzle to remove the excess aqueous solution from the surfaces of the supporting membrane. Thereafter, a 25° C. n-decane solution containing 0.12% by weight trimesoyl chloride was applied to a surface of the membrane so that the membrane surface was completely wetted. After this membrane was allowed to stand still for 1 minute, the membrane surface was held vertically for 1 minute in order to remove the excess solution from the membrane. Thereafter, the membrane was cleaned with 45° C. water for 2 minutes to thereby obtain a composite semipermeable membrane including a substrate, a porous support, and a polyamide separation functional layer.

Example 2

A composite semipermeable membrane of Example 2 was obtained in the same manner as in Example 1, except that a DMF solution having a polysulfone concentration of 20% by weight was used as a thermoplastic-resin solution and that a long-fiber nonwoven fabric having a thickness of 99 μm (fiber diameter: 1 dtex, weight: 48.8 g/m²) was used as a substrate.

Example 3

A composite semipermeable membrane of Example 3 was obtained in the same manner as in Example 1, except that a DMF solution having a polysulfone concentration of 20% by weight was used as a thermoplastic-resin solution and that a long-fiber nonwoven fabric having a thickness of 105 μm and a weight of 80.1 g/m² (fiber diameter: 1 dtex) was used as a substrate.

Example 4

A composite semipermeable membrane of Example 4 was obtained in the same manner as in Example 1, except that a DMF solution having a polysulfone concentration of 20% by weight was used as a thermoplastic-resin solution and that a long-fiber nonwoven fabric having a thickness of 75 μm and a weight of 24.7 g/m² (fiber diameter: 1 dtex) was used as a substrate.

Example 5

A mixture of a chlorinated vinyl chloride resin having a polymerization degree of 700 and a chlorine content ratio of 67.3% (HA-24K, manufactured by Sekisui Chemical Co., Ltd.) and a solvent (DMF) was kept being heated at a dissolution temperature of 60° C. with stirring for 1.5 hours, thereby preparing a thermoplastic-resin solution. The concentration of the chlorinated vinyl chloride resin in this raw material solution was 16% by weight.

A composite semipermeable membrane was obtained in the same manner as in Example 1, except that this raw material solution was used and a long-fiber nonwoven fabric having a thickness of 75.3 μm and a weight of 49.6 g/m² (fiber diameter: 1 dtex) was used as a substrate.

Furthermore, this composite semipermeable membrane was immersed at 35° C. for 30 seconds in a 0.3% by weight aqueous sodium nitrite solution having a pH adjusted to 3.0 with sulfuric acid, and was then immediately immersed in a water bath. Thus, a composite semipermeable membrane of Example 5 was obtained.

Example 6

A composite semipermeable membrane of Example 6 was obtained in the same manner as in Example 1, except that a chlorinated vinyl chloride resin having a polymerization degree of 600 and a chlorine content ratio of 62% (HA-15E, manufactured by Sekisui Chemical Co., Ltd.) was used as a thermoplastic resin.

Example 7

A composite semipermeable membrane of Example 7 was obtained in the same manner as in Example 1, except that a chlorinated vinyl chloride resin having a polymerization degree of 1,000 and a chlorine content ratio of 67.3% (HA-53K, manufactured by Sekisui Chemical Co., Ltd.) was used as a thermoplastic resin.

Example 8

A composite semipermeable membrane according to Example 8 was obtained in the same manner as in Example 1, except that a chlorinated vinyl chloride resin having a polymerization degree of 700 and a chlorine content ratio of 68.3% (HA-27L, manufactured by Sekisui Chemical Co., Ltd.) was used as a thermoplastic resin.

Example 9

A composite semipermeable membrane according to Example 9 was obtained in the same manner as in Example 1, except that a 20% by weight DMF solution of an ABS resin (TOYOLAC (registered trademark) 100) was used as a thermoplastic-resin solution.

Comparative Example 1

A supporting membrane was obtained in the same manner as in Example 1, except that a long-fiber nonwoven fabric having a thickness of 180 μm and a weight of 110 g/m² (fiber diameter: 1 dtex) was used as a substrate. A separation functional layer was formed on the supporting membrane obtained, in the same manner as in Example 1. Thus, a composite semipermeable membrane of Comparative Example 1 was obtained.

Comparative Example 2

A composite semipermeable membrane of Comparative Example 2 was obtained in the same manner as in Comparative Example 1, except that a long-fiber nonwoven fabric having a thickness of 120.4 μm and a weight of 110 g/m² (fiber diameter: 1 dtex) was used as a substrate.

Comparative Example 3

A composite semipermeable membrane of Comparative Example 3 was obtained in the same manner as in Comparative Example 1, except that a long-fiber nonwoven fabric having a thickness of 105 μm and a weight of 24 g/m² (fiber diameter: 1 dtex) was used as a substrate.

Comparative Example 4

A composite semipermeable membrane of Comparative Example 4 was obtained in the same manner as in Example 1, except that a long-fiber nonwoven fabric having a thickness of 82.5 μm and a weight of 72.5 g/m² (fiber diameter: 1 dtex) was used as a substrate.

Comparative Example 5

A composite semipermeable membrane of Comparative Example 5 was obtained in the same manner as in Example 1, except that a long-fiber nonwoven fabric having a thickness of 75 μm and a weight of 80 g/m² was used as a substrate.

Comparative Example 6

A composite semipermeable membrane of Comparative Example 6 was obtained in the same manner as in Comparative Example 1, except that a 16% by weight DMF solution of a poly(vinyl chloride) resin having a polymerization degree of 500 and a chlorine content ratio of 56.8% (TS-1000R) was used as a thermoplastic-resin solution and that a short-fiber nonwoven fabric having a thickness of 91 μm and a weight of 84.3 g/m² (average length of single fibers: 0.5 to 20 mm) was used as a substrate.

Comparative Example 7

A composite semipermeable membrane of Comparative Example 7 was obtained in the same manner as in Comparative Example 1, except that a short-fiber nonwoven fabric having a thickness of 91 μm and a weight of 84.3 g/m² (average length of single fibers: 0.5 to 20 mm) was used as a substrate.

<1. Porosity of Substrate>

As described above, the apparent volume (cm³) of a dried substrate was measured first. Next, this substrate was impregnated with pure water, and the weight of the impregnated substrate was measured. The dry weight of the substrate was subtracted from the weight of the water-impregnated substrate. That is, the weight of the water which has entered the interstices of the substrate (g: namely, the volume of the water, cm³) was calculated. This value was divided by the apparent volume of the substrate. Thus, the porosity in terms of percentage (%) was obtained.

<2. Weights of Supporting Membrane, Composite Substrate, Substrate, and Porous Support in the Substrate>

Each supporting membrane was cut to obtain five pieces. Each piece was dried at 130° C. for 3 hours, and the weight of the dried piece was measured.

An aluminum tape having high pressure-sensitive adhesiveness (AT-75, manufactured by Nitto Denko Corp.) was applied to the surface of the porous support of each piece which had undergone the weight measurement. Using Tensilon tester (RTG-1210), this aluminum tape was pulled at 25° C. and a chuck travelling speed of 10 mm/min in a peel direction of 180° to thereby peel the portion of the porous support which was present on the substrate, from the substrate. Thus, a composite substrate configured of the substrate and the resin within the substrate (the portion indicated by "42" in FIG. 1) was obtained. This composite substrate was dried at 130° C. for 3 hours, and the weight of the dried composite substrate was measured.

Next, the dried composite substrate was immersed in DMF solution for 3 hours or more to dissolve away the porous support present in the substrate. Thus, the substrate only was taken out from the composite substrate. Thereafter, this substrate was washed with pure water and then dried at 130° C. for 3 hours. The weight of the substrate thus obtained was measured.

The weight of the substrate was subtracted from the weight of the composite substrate to thereby determine the weight of the porous support present in the substrate.

The operation described above was performed with respect to the five pieces, and each value obtained was divided by the area of the sample to thereby calculate the basis weight of each constituent element per unit area of the supporting membrane. Since five values were obtained with respect to the weight of each constituent element in each of the supporting membranes, an arithmetic average thereof was calculated. The arithmetic average value obtained is shown in the tables as the weight (basis weight) of each element per unit area of the supporting membrane (i.e., per unit area of the substrate).

<3. Ratio between Weight A of Substrate and Weight B of Porous Support Present in the Substrate, B/A>

From the weight A of the substrate and the weight B of the porous support present in the substrate, B/A was calculated, the weights A and B having been obtained by conducting the same procedure as in <2.> above.

<4. Thicknesses of Supporting Membrane, Substrate, Impregnated Portion of Porous-Support into the Substrate, and Porous-Support Present on the Substrate>

Each supporting membrane was cut to obtain five pieces. Ten small-piece samples were taken from each piece, and a cross-section of each sample was photographed with a scanning electron microscope at a magnification of 100 to 1,000 times. On each of the images obtained by the photographing, the thickness of the supporting membrane was measured. From the 50 values obtained with respect to each supporting membrane, an arithmetic average was calculated. This average value is shown in the tables as the thickness of the supporting membrane.

Meanwhile, other five pieces were obtained from each supporting membrane, and five pieces of a composite substrate (the portion indicated by "42" in FIG. 1) were obtained from each supporting membrane.

Ten small-piece samples were taken from each piece. A cross-section of each sample was photographed with a scanning electron microscope at a magnification of 100 to 1,000 times. On each of the images obtained by the photographing, the thickness of the substrate and the thickness of the resin which had been impregnated from the surface layer (front surface) of the substrate toward the back surface thereof were measured. Thus, 50 values were obtained with respect to each of the thickness of the substrate and the thickness of impregnation in each supporting membrane. Arithmetic average values were calculated from these values and rounded off to the nearest whole numbers. The values thus obtained are shown in the tables as the thickness of the substrate and the thickness of the impregnated portion of the porous support into the substrate, in each supporting membrane.

The thickness of the porous support present on the substrate was calculated from the thickness of the supporting membrane described above and the thickness of the substrate.

<5. Total Porosity of Composite Substrate>

Five pieces of a composite substrate 42 were obtained from each supporting membrane by the procedure described above.

The apparent volume (cm$^3$) of each composite substrate was calculated from the area and thickness of the composite substrate.

The composite substrate was impregnated with pure water, and the weight of the impregnated composite substrate was measured. The dry weight of the composite substrate was subtracted from the weight of the water-impregnated composite substrate. That is, the weight of the water which had entered the interstices of the composite substrate (g: namely, the volume of the water, cm$^3$) was calculated. The volume of the water (cm$^3$) thus obtained was divided by the apparent volume of the substrate to obtain a porosity in terms of percentage (%). The porosity was calculated for each of the five pieces obtained from each supporting membrane, and an arithmetic average value thereof was calculated. The value obtained is shown in the tables as the final total porosity.

<6. Average Weight of Separation Functional Layer>

A composite semipermeable membrane was cut to obtain a piece of 50 cm×100 cm. The substrate in this piece was peeled from the porous support to thereby obtain a composite composed of the porous support and the separation functional layer disposed thereon. This composite was introduced into dichloromethane, and this mixture was stirred. Thus, the porous support only was dissolved away. The mixture thus obtained was filtrated under vacuum using a membrane filter (product name T300A090C, manufactured by ADVANTEC; pore diameter, 3 μm) made of PTFE (polytetrafluoroethylene). As a result, the separation functional layer remained on the filter. The separation functional layer was recovered, introduced again into dichloromethane, and purified through stirring and filtration by the procedure shown above. This operation was repeatedly performed five times to thereby recover the separation functional layer only. The separation functional layer recovered was dried in a vacuum oven for 24 hours and then subjected to a weight measurement to determine the average weight (mg/m$^2$) of the separation functional layer.

<7. Average Surface Roughness>

A substrate on which a porous support had not been formed was cut to thereby obtain a test specimen of 100 mm×100 mm. This test specimen was attached, in the state of being stretched at a tension of 10 gf, to the smooth metallic plane of the testing stand of a high-accuracy shape measurement system (Type: KS-100) manufactured by Keyence Corp., in an atmosphere of 25° C. and 60% RH. While causing the test specimen to travel horizontally over 5,000 μm at a constant speed of 0.1 m/sec, a surface roughness examination was made along the length and width directions. This operation was conducted five times with respect to each test specimen to thereby obtain ten values of surface roughness in total. An arithmetic average value was calculated from the ten values thus obtained, thereby obtaining the average surface roughness (μm). The value thus obtained is shown in the tables as "Average surface roughness of substrate before operation".

With respect to a semipermeable membrane which had undergone the same 24-hour filtration treatment as in the determination of salt removal ratio described below, the portion of the porous support which was present on the substrate was peeled from the substrate and the remaining portion of the porous support was dissolved away, in the same manner as in <2.> above, thereby obtaining the substrate. With respect to this substrate also, the average surface roughness was obtained by the same procedure as described above. The value obtained is shown in the tables as "Average surface roughness of substrate after operation".

<8. Salt Removal Ratio (TDS Rejection)>

Seawater having a temperature 25° C. and a pH of 6.5 (corresponding to feed water) was supplied to a composite semipermeable membrane at an operation pressure of 5.5 MPa to thereby perform a filtration treatment over 24 hours. The permeate obtained was used to determine the TDS rejection.

The electrical conductivity of the feed water and that of the permeate were measured with a conductance meter manufactured by Toa Denpa Kogyo Co., Ltd., thereby obtaining the practical salinity. The salt removal ratio, i.e., TDS rejection, was determined from a TDS concentration obtained by converting the practical salinity, using the following equation.

$$\text{TDS rejection (\%)} = 100 \times \{1 - [(\text{TDS concentration in permeate})/(\text{TDS concentration in feed water})]\}$$

<9. Membrane Permeation Flux>

The amount of permeate obtained by the filtration treatment conducted for 24 hours was converted to water permeability (m$^3$) per day per square meter of the membrane, and expressed as membrane permeation flux (m$^3$/m$^2$/day).

<10. Durability>

Peel strength was measured as durability using Tensilon tester (RTG-1210). Specifically, a fresh membrane sample which had undergone neither pressure application nor water passing was cut to obtain ten pieces. Each piece was subjected to peeling at 25° C. in a peel direction of 180° at a chuck travelling speed of 10 mm/min to thereby determine a maximum value of peel strength. An average of the ten values obtained for the specimens was calculated to thereby obtain the peel strength. In cases when the peel strength thus determined is 1.90 N/25 mm or greater, this membrane is thought to have high durability.

<11. Results>

The results of those examinations are shown in Tables 1 and 2. In Examples 1 to 9, composite semipermeable membranes which each combined high peeling resistance and high water permeability were obtained.

In particular, in Examples 1 to 9, a high peel strength and high water permeability were obtained because substrates having a higher porosity than in the composite semipermeable membranes of Comparative Examples 2, 4, 5, and 7 had been used in the Examples.

In Example 1, high water permeability was obtained because the ratio of impregnation of the porous support into the substrate (B/A) had been higher and the weight of the composite substrate (A+B) had been smaller than in Comparative Example 1. Furthermore, in Example 1, the weight of the separation functional layer per unit area of the semipermeable membrane was larger than in Comparative Example 1. This is thought to be because in Example 1, a large amount of a monomer had been supplied from the porous support to the field of interfacial polymerization for forming a separation functional layer (i.e., the field of growth of pleats) and, hence, pleats of the separation functional layer had grown high.

In Comparative Example 3, the composite semipermeable membrane had a high peel strength and a high permeation flux but had a low TDS rejection, due to the high porosity of the substrate. This is thought to be because the monomer supply to the field of interfacial polymerization for forming a separation functional layer had been insufficient, rendering the formation of a separation functional layer insufficient.

Meanwhile, in Comparative Example 6, the composite semipermeable membrane showed a reduced TDS rejection and a reduced permeation flux because of the too low ratio of impregnation (B/A) and especially because not a chlorinated vinyl chloride resin but a poly(vinyl chloride) resin having a high affinity for water had been used. The reason for this is thought to be as follows. Because the affinity for water of the poly(vinyl chloride) resin was higher than that of the chlorinated vinyl chloride resin, the surface layer of the porous support was low in grain density, which contributes to the growth of pleats. As a result, the formation of pleats in the separation functional layer had not proceeded.

In addition, in the Examples, there was no large difference in substrate surface roughness between before and after the operation even when substrates having a low basis weight had been used. It was thus ascertained that no compaction due to operation pressure had occurred.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Substrate | Shape | | long fiber | long fiber | long fiber | long fiber | long fiber | long fiber | long fiber | long fiber | long fiber |
| | Material | | PET | PET | PET | PET | PET | PET | PET | PET | PET |
| | Weight (A) | g/m² | 49.5 | 48.8 | 80.1 | 24.7 | 49.6 | 49.7 | 49.6 | 49.7 | 49.8 |
| | Thickness | μm | 75.3 | 99 | 105 | 75 | 75.3 | 75.6 | 75.3 | 75.6 | 74.9 |
| | Porosity | % | 51.3% | 63.5% | 43.5% | 75.6% | 51.2% | 51.3% | 51.2% | 51.3% | 50.7% |
| Thermoplastic resin | Material | | PSf | PSf | PSf | PSf | HA-24K | HA-15E | HA-53K | HA-27L | ABS |
| | Chlorine content ratio | % | — | — | — | 67.3 | 62 | 67.3 | 68.3 | — | — |
| | Polymerization degree | — | — | — | — | — | 700 | 600 | 1000 | 700 | — |
| | Concentration | wt % | 16 | 16 | 20 | 20 | 16 | 16 | 16 | 16 | 20 |
| Supporting membrane | Weight | g/m² | 71 | 78 | 109 | 55 | 75 | 75 | 78 | 77 | 82 |
| | Thickness | μm | 109 | 142 | 155 | 108 | 102 | 104 | 107 | 110 | 109 |
| (Thickness of porous support present on substrate)/(thickness of substrate) | | % | 44.8% | 43.4% | 47.6% | 44.0% | 35.5% | 37.6% | 42.1% | 45.5% | 44.9% |
| (Thickness of impregnated portion of porous support into substrate)/(thickness of substrate) | | — | 98% | 98% | 99% | 99% | 96% | 96% | 96% | 98% | 94% |
| Total porosity of impregnated portion | | % | 34.7% | 44.3% | 33.2% | 58.9% | 20.1% | 24.3% | 24.4% | 26.8% | 36.8% |
| Weight of porous support present in substrate (B) | | g/m² | 6.1 | 9.9 | 9.0 | 11.2 | 5.9 | 6.0 | 5.9 | 6.1 | 7.1 |
| B/A | | | 0.12 | 0.20 | 0.11 | 0.45 | 0.12 | 0.12 | 0.12 | 0.12 | 0.14 |
| A + B | | g/m² | 55.6 | 58.7 | 89.1 | 35.9 | 55.5 | 55.7 | 55.5 | 55.8 | 56.9 |
| Average surface roughness of substrate | Before operation | μm | 7.5 | 12.2 | 6.62 | 9.49 | 6.58 | 6.64 | 6.62 | 6.54 | 7.01 |
| | After operation | μm | 7.23 | 11.94 | 6.5 | 9.42 | 6.28 | 6.34 | 6.44 | 6.01 | 6.33 |
| Average weight of separation functional layer | | mg/m² | 143 | 139 | 138 | 157 | 135 | 135 | 124 | 133 | 84 |
| Durability [peel strength] | | N/25 mm | 1.23 | 1.21 | 1.49 | 1.61 | 1.19 | 1.33 | 1.22 | 1.23 | 1.01 |
| Performance of composite semipermeable membrane | TDS rejection | % | 99.82 | 99.83 | 99.81 | 99.78 | 99.81 | 99.75 | 99.82 | 99.8 | 99.54 |
| | Permeation flux | m³/m²/day | 0.91 | 0.89 | 0.82 | 1.02 | 0.83 | 0.84 | 0.76 | 0.82 | 0.61 |

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Substrate | Shape | | long fiber | long fiber | long fiber | long fiber | long fiber | short fiber | short fiber |
| | Material | | PET | PET | PET | PET | PET | PET | PET |
| | Weight (A) | g/m² | 110 | 110 | 24 | 72.5 | 80 | 84.3 | 84.3 |
| | Thickness | μm | 180 | 120.4 | 105 | 82.5 | 75 | 91 | 91 |
| | Porosity | % | 54.7% | 32.3% | 83.1% | 34.9% | 21.0% | 50.7% | 31.4% |
| Thermoplastic resin | Material | | PSf | PSf | PSf | PSf | PSf | PVC | PSf |
| | Chlorine content ratio | % | — | — | — | — | — | 56.8 | — |
| | Polymerization degree | — | — | — | — | — | — | 500 | — |
| | Concentration | wt % | 16 | 16 | 16 | 16 | 16 | 16 | 16 |

TABLE 2-continued

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Supporting membrane | Weight | g/m² | 164 | 144 | 65 | 96 | 100 | 109 | 133 |
| | Thickness | μm | 271 | 185 | 163 | 126 | 116 | 122 | 181 |
| (Thickness of porous support present on substrate)/(thickness of substrate) | | % | 50.6% | 53.7% | 55.2% | 53.1% | 54.4% | 34.1% | 98.9% |
| (Thickness of impregnated portion of porous support into substrate)/(thickness of substrate) | | | — | 58% | 56% | 98% | 53% | 45% | 55% | 57% |
| Total porosity of impregnated portion | | % | 36.7% | 13.2% | 62.4% | 15.7% | 3.1% | 33.3% | 9.4% |
| Weight of porous support present in substrate (B) | | g/m² | 9.1 | 3.5 | 13.7 | 2.4 | 1.1 | 2.5 | 2.6 |
| B/A | | | 0.08 | 0.03 | 0.57 | 0.03 | 0.01 | 0.03 | 0.03 |
| A + B | | g/m² | 119.1 | 113.5 | 37.7 | 75.0 | 81.1 | 86.8 | 86.9 |
| Average surface roughness of substrate | Before operation | μm | 18.2 | 4.2 | 8.8 | 4.6 | 17.2 | 6.91 | 3.61 |
| | After operation | μm | 17.49 | 4.21 | 4.21 | 4.73 | 16.41 | 6.32 | 3.66 |
| Average weight of separation functional layer | | mg/m² | 92 | 108 | 117 | 102 | 83 | 65 | 103 |
| Durability [peel strength] | | N/25 mm | 1.27 | 0.91 | 1.11 | 0.88 | 0.78 | 1.38 | 0.68 |
| Performance of composite semipermeable membrane | TDS rejection | % | 99.21 | 99.74 | 90.4 | 99.72 | 99.68 | 98.1 | 99.56 |
| | Permeation flux | m³/m²/day | 0.48 | 0.57 | 2.6 | 0.59 | 0.49 | 0.11 | 0.62 |

INDUSTRIAL APPLICABILITY

The composite semipermeable membrane of the present invention is suitable especially for the desalination of seawater or brackish water.

DESCRIPTION OF REFERENCE NUMERALS AND SIGNS

1: Composite semipermeable membrane
2: Supporting membrane
3: Substrate
4: Porous support
40: Porous support which is present on the substrate
41: Porous support which is present in the substrate
42: Composite substrate
5: Separation functional layer

The invention claimed is:

1. A composite semipermeable membrane comprising:
a supporting membrane comprising a substrate and a porous support; and a separation functional layer disposed on the porous support,
wherein said substrate comprises a portion of the porous support;
wherein the composite semipermeable membrane comprises a composite substrate, said composite substrate comprising said substrate and said portion of the porous support;
wherein the substrate has a weight A per unit area, said portion of the porous support within the substrate has a weight B per unit area, and a sum of the weight A and the weight B, (A+B), is 55 to 109 g/m²,
wherein a ratio between the weight A and the weight B, B/A, is 0.10 to 0.60,
wherein said portion of the porous support within the substrate has a thickness that is 60% to 99% of the thickness of the substrate,
wherein said composite substrate has a total porosity of 10% to 60%,
wherein said substrate without not comprising the portion of the porous support has a porosity of 40% to 80%,
wherein the substrate is a long-fiber nonwoven fabric,
wherein a peel strength between the substrate and the porous support is 0.5 N/25 mm or greater and less than 7.5 N/25 mm, the peel strength being measured by peeling the porous support from the substrate at 10 mm/min and a peel direction of 180° under a temperature condition of 25° C.,
wherein the porous support comprises a thermoplastic resin, and
wherein the thermoplastic resin is at least one thermoplastic resin selected from: polysulfones, poly(phenylene sulfide sulfone)s, polyacrylamide, poly(phenylene sulfone), polyethersulfones and derivatives thereof; cellulose esters; polyacrylonitrile; poly(vinyl chloride); a chlorinated vinyl chloride-based resin; and an acrylonitrile butadiene styrene (ABS) resin.

2. The composite semipermeable membrane according to claim 1, wherein the substrate has a thickness of 40 to 150 μm.

3. The composite semipermeable membrane according to claim 2,
wherein the porous support comprises a chlorinated vinyl chloride-based resin and has a chlorine content ratio of 60 to 70%, and a polymerization degree of a vinyl chloride-based resin contained in the porous support is 400 to 1,100; and
wherein the substrate comprises a polyester.

4. The composite semipermeable membrane according to claim 1, wherein the porous support includes a portion disposed so as to be exposed on the substrate, and the exposed portion has a thickness of 50% or less of the thickness of the substrate.

5. The composite semipermeable membrane according to claim 1, wherein the peel strength between the substrate and the porous support is 1.01 N/25 mm or greater and less than 7.5 N/25 mm.

6. The composite semipermeable membrane according to claim 1, wherein the separation functional layer comprises a crosslinked polyamide formed by interfacial polymerization of an aqueous solution of a polyfunctional amine with a polyfunctional acid halide, and the separation functional layer has an average weight of 80 to 200 mg/m$^2$.

7. The composite semipermeable membrane according to claim 1, wherein the porous support contains the chlorinated vinyl chloride-based resin and has a chlorine content ratio of 60 to 70%, and a polymerization degree of a vinyl chloride-based resin contained in the porous support is 400 to 1,100.

8. The composite semipermeable membrane according to claim 1, wherein the substrate comprises a polyester.

\* \* \* \* \*